Feb. 3, 1959  G. E. SORENSEN  2,871,570
DIMENSION AVERAGING OF OVERLENGTH BY UNDERLENGTH SCALE
Filed June 4, 1956  3 Sheets-Sheet 1
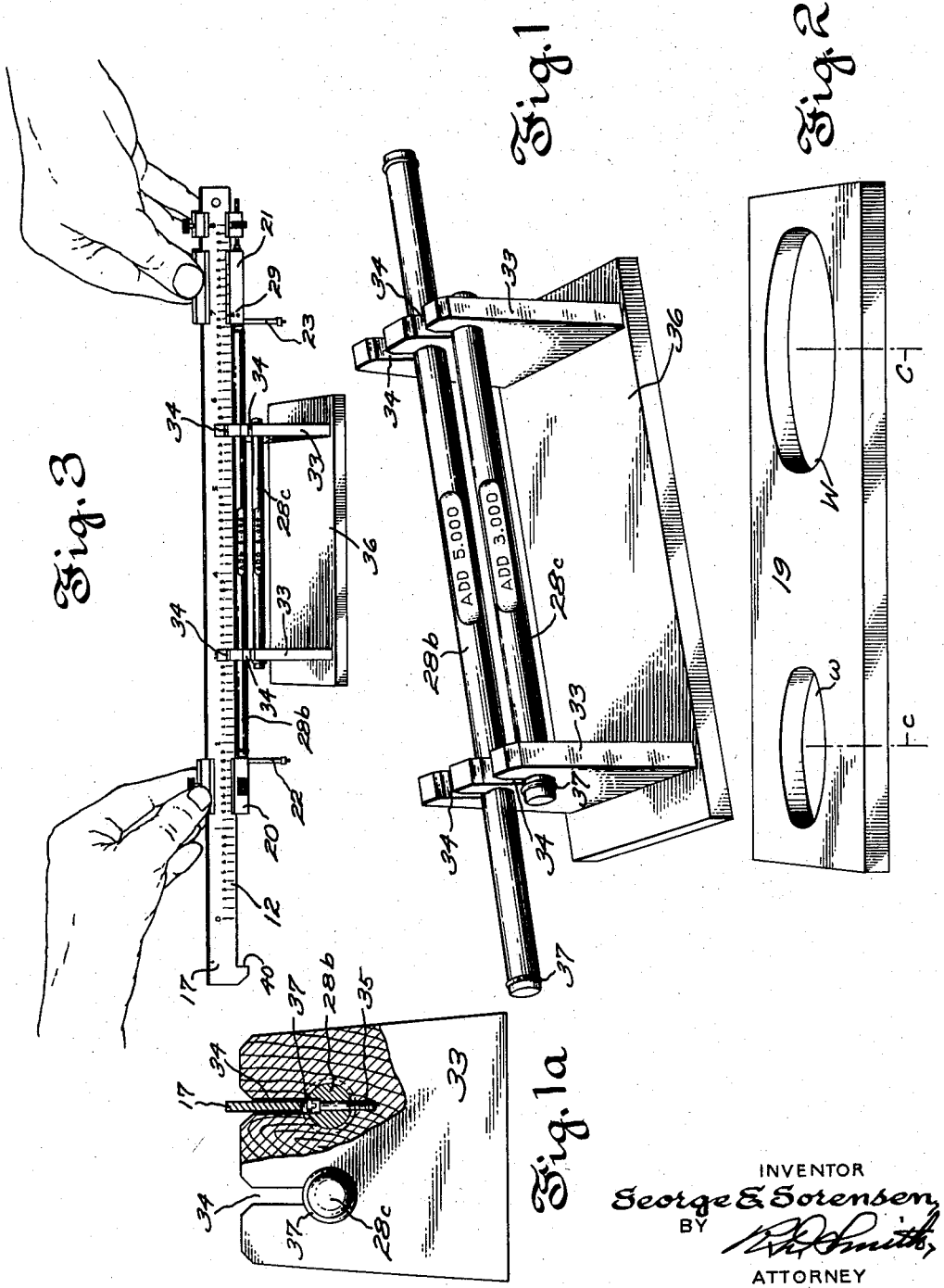
INVENTOR
George E. Sorensen
BY
ATTORNEY Feb. 3, 1959 G. E. SORENSEN 2,871,570
DIMENSION AVERAGING OF OVERLENGTH BY UNDERLENGTH SCALE
Filed June 4, 1956 3 Sheets-Sheet 2
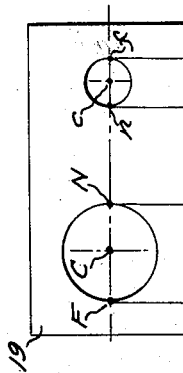
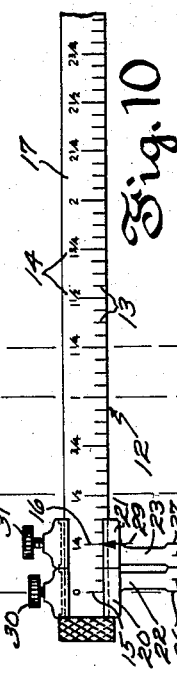
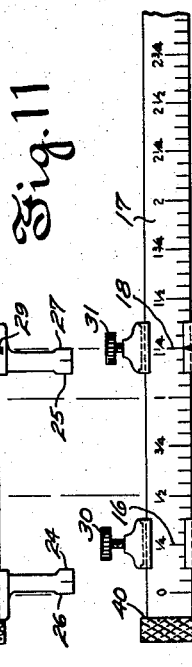
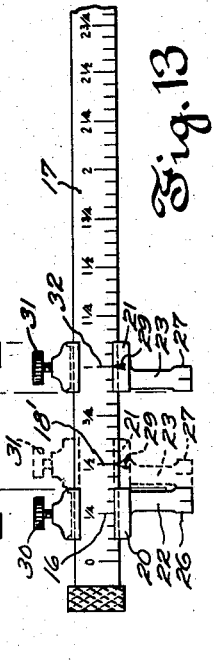
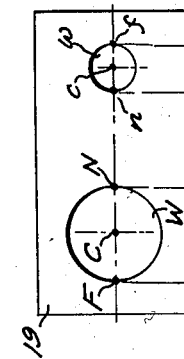
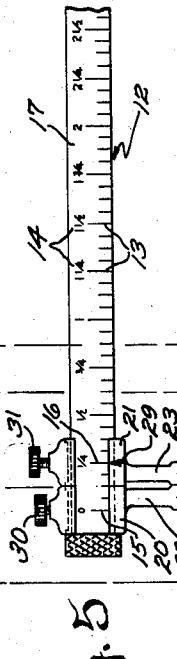
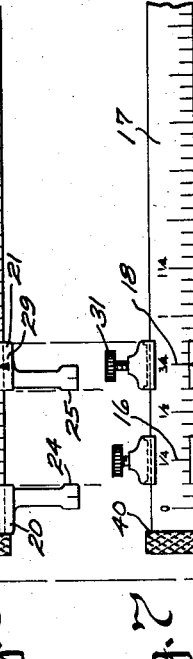
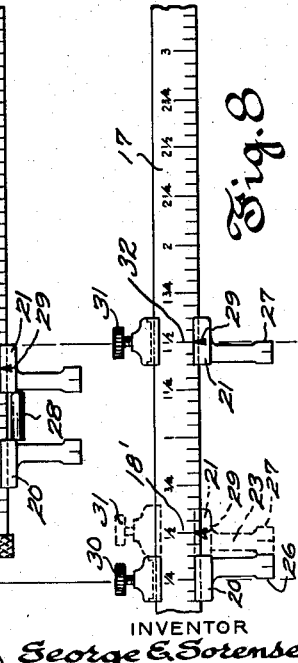
INVENTOR
George E. Sorensen
BY
ATTORNEY Feb. 3, 1959     G. E. SORENSEN     2,871,570
DIMENSION AVERAGING OF OVERLENGTH BY UNDERLENGTH SCALE
Filed June 4, 1956     3 Sheets-Sheet 3
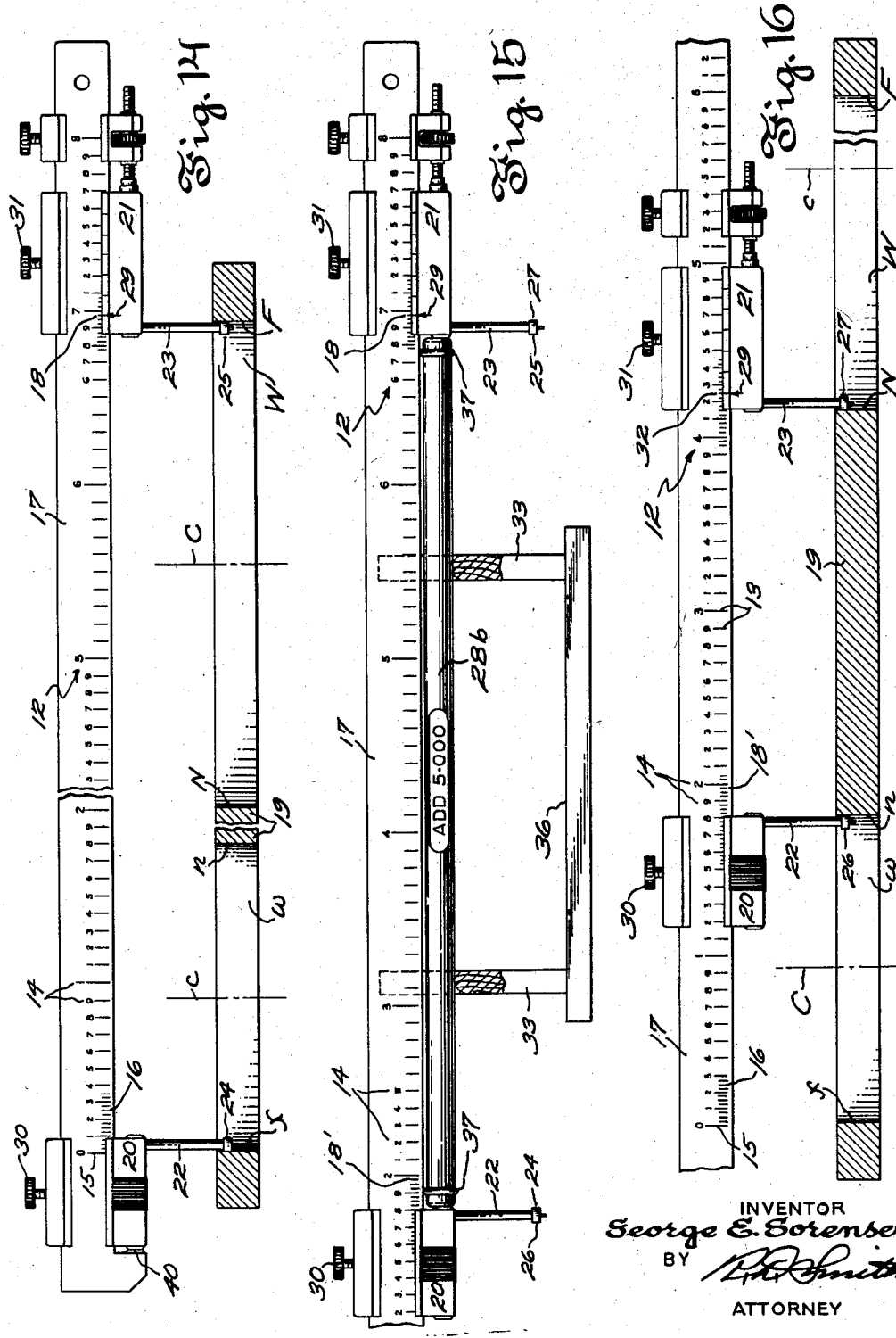
INVENTOR
George E. Sorensen
BY
ATTORNEY

United States Patent Office 2,871,570
Patented Feb. 3, 1959

2,871,570

DIMENSION AVERAGING OF OVERLENGTH BY UNDERLENGTH SCALE

George E. Sorensen, Cheshire, Conn.

Application June 4, 1956, Serial No. 589,215

11 Claims. (Cl. 33—143)

This invention relates to improved methods and/or apparatus making it possible to use a dimension averaging measuring instrument of a kind disclosed in my United States Patent No. 2,677,186 to ascertain the spacing of unmarked hole centers that are more than half as far apart as the usable length of a scale of half value measurement reading graduations on the instrument.

Center distance finding instruments of this kind afford direct reading of the true measure of distance between two unmarked centers of parallel holes, grooves, studs, ridges etc. by successive steps of calipering certain distances between work surfaces that bound the holes or projections. The dimension averaging operation involves stepping off end-to-end on a single continuous scale of half value reading graduations the distances of two successively calipered spans. One such span may be the distance between nearest together points in the boundary surfaces of two different holes, in which case the other span to be calipered separately thereafter is the distance between the farthest apart points in the boundary surfaces of the same two different holes. The sequence of calipering steps can be reversed and/or altered as is more fully explained in my said patent.

Prior to discovery of the present method the overall usable length of the scale of half value reading graduations on the instrument positively limited the maximum length of center distance that could be ascertained by use of the instrument to dimensions that were approximately not more than half the usable length of the scale. Therefore in order to perform center distance measuring of greater work dimensions it was considered necessary to restort to a longer instrument having a longer scale of half value reading graduations. Relatively long scales become unwieldy for measuring relatively short center distances, such as lie within a normal range of work dimensions for which a given instrument is most commonly used. Also the extreme accuracy and fine workmanship demanded of such instruments make them costly and necessitate a sizable investment to stock a variety of them in the tool room.

An object of the present improvements is to enable a dimension averaging instrument of convenient length for use in ascertaining relatively short center distances to be used for ascertaining unusually long center distances without resorting to an extra long instrument having an extra long scale of the half value reading graduations.

For simplifying the present disclosure my improved method will be described as involving a new step that can be performed in connection with the calipering of work when making use of a dimension averaging instrument like that disclosed in my aforesaid patent. There is also disclosed herein certain auxiliary apparatus constructed especially to aid in the performance of this new method step. It further will appear hereinafter that practice of the improved method does not require the auxiliary apparatus referred to.

The foregoing and other objects of the improvements will be clear in fuller particular from the following description of my improved method and auxiliary apparatus having reference to the accompanying drawings wherein:

Fig. 1 shows a preferred form of auxiliary apparatus incorporating the invention which may or need not be used in performing my improved method.

Fig. 1a is a view taken partially in section through the rack and spacer rods of Fig. 1.

Fig. 2 shows a workpiece containing two spaced apart round holes the distance between whose centers is to be determined by the presently improved method.

Fig. 3 shows the hands of an operator practicing a step in my improved method with the aid of a center distance finding instrument like that of my U. S. Patent 2,677,186 whose scale of graduations is too short for accumulating end-to-end thereon certain successively stepped off work distances that might need to be calipered.

Figs. 4 to 8 inclusive illustrate diagrammatically, for comparison with Figs. 12 to 17 of my aforesaid patent, the introduction of a new method step that is involved in the present improvements for increasing the measuring range of a dimension averaging instrument.

Figs. 9 to 13 inclusive are like Figs. 4 to 8, respectively, showing a different sequence of the calipering steps.

Fig. 14 is a contracted sectional view of a workpiece as in Fig. 2 with the farthest apart points on the boundary surfaces of different holes being spanned or calipered by a measurement averaging instrument as in my said patent.

Fig. 15 shows a mechanized way to practice a new step in my improved method with the aid of the apparatus of Fig. 1.

Fig. 16 shows a final calipering step to be performed in mechanized practice of the improved method.

In the drawings, apparatus especially constructed to aid in the practice of the improved method appears in Fig. 1, and it is shown as being put to such use in Fig. 3. The invention resides in part in a method that does not require the use of the herein illustrated apparatus. It could in fact be performed by using merely the single continuous scale 12 of half value denominated graduations 13. The method comes into need where the usable length of the scale is less than approximately twice the to-be-found distance between the unmarked centers C, c of holes W, w in a workpiece 19.

As explained in greater particular in my U. S. Patent 2,677,186, the graduations 13 of scale 12 are termed half value reading graduations because they are numerically denominated by indicia 14 to read as half the actual spacings of the graduations from a zero location 15 of the scale. It is immaterial whether or not such zero location is physically present on the instrument.

In my aforesaid patent it is proposed that the distance between hole centers C, c be ascertained by first stepping off on scale 12 from a beginning graduation 16 a first span of 1″ determined by the rectilinear distance 1″ between the nearest together points N, n on boundary surfaces of respectively different holes. By principles of the proper structure and function of a dimension averaging instrument explained in my aforesaid patent, the beginning graduation 16 should be denominated as the actual distance between the median points 47, 48 of the calipering legs 22, 23 in the starting position of the slides 20, 21.

Specifically this first stepping-off operation as herein illustrated consists in moving the index mark 29 with slide 21 to the right said actual distance of 1″ in Fig. 6 which in this instance is an amount of stepping-off movement which coincides with the work distance N—n to be calipered. This is because in Fig. 5 in starting position the work sensing terminals 24, 25 of calipering legs 22, 23 are in actual contact. If in their initial position in Fig. 5 work sensing terminals 24, 25 were separated by any space, the 1″ extent of stepping-off movement of slide 21 would be reduced the extent of such initial space when calipering the points N—n. Slide 21 will be locked in its position in Fig. 6 by tightening the thumb screw 31.

The aforesaid "stepping-off" operation could be done without use of the instrument by laying off the said 1" span from the ¼" beginning graduation 16 of the scale with the mere aid of machinists' dividers which would transfer the dimension of the work to the scale. Or the graduated bare edge of the scale beam 17 could be placed in direct contact with the workpiece 19 in the common way of measuring work dimensions by means of a scale. In whatever way the 1" stepping-off operation may be accomplished, the graduation ¾" on the scale, that is first thus arrived at by index 29, may appropriately be termed a relay point 18 because in my aforesaid patent such relay point is made use of as a new starting point from which to step off subsequently on the scale a second span determined by the rectilinear distance 2½" between the farthest apart boundaries F—f of the work holes. In this second stepping-off operation the movement of index mark 29 is 2½" minus ½" because the work sensing terminals 26, 27 are ½" apart at the beginning of the second stepping-off operation. By this second stepping-off operation in the patent, index mark 29 reaches the graduation 1¾" on scale 12 which is the final reading and true measure of center distance C—c which was to be found.

In the above mentioned way of using the instrument as proposed in my patent, the scale 12 must be at least substantially twice as long as the distance between the hole centers C—c in order to be able to accumulate end-to-end on the scale the approximate sum of the distances F—f and N—n.

According to the presently improved method, however, the second span of 2½", if regarded as being stepped off forwardly on the scale from the relay point 18, is reduced an extent equal to a known dimensional constant assumed in Fig. 7 to be the actual ½" length of a spacer rod 28. In using the instrument this is done by tightening thumbscrew 31 and then moving the slide 20 to the right until it contacts the spacer rod 28 as shown in Fig. 7 in which position slide 20 will be locked by tightening thumbscrew 30. Now when spacer rod 28 is removed and the step of calipering the distance F—f is performed the corresponding stepping off of the second span of 2" on the scale ends with an index reading of 1½", instead as heretofore of the final or ultimate reading of 1¾". But 1½" is not the correct value of the center distance that is to be ascertained. By my improved method the true dimensional value of the center distance C—c is then ascertained by adding to the final reading 1½", not the full amount of the dimensional constant ½" by which the length of the second span was actually reduced, but by adding one-half the numerical value of said constant, or ¼". This gives the correct center distance, 1¾" by the improved method.

Practice of this new method thus has accomplished a valuable extension of the measuring scope of the instrument enabling a continuous scale of half value reading graduations of relatively limited short length to be used to ascertain a distance between hole centers which exceeds substantially half the overall usable length of the scale. In other words the center distance of 1¾" requires for its measurement an instrument scale at least as long as 3½" by the old method whereas by this improved method the scale need be no longer than approximately 3".

A fuller understanding of the method may be gained if it be imagined that with the slide 20 locked by means of its thumbscrew 30 in its position shown in Figs. 7 and 8 and prior to calipering the distance F—f and stepping off the corresponding second span of 2" on the scale, the slide 21 is set backward to its broken line position in Fig. 8. This in effect sets back the index mark 29 and thereby transposes the relay point 18 backward on the scale to the position of the ½" graduation. This then becomes the transposed relay point 18' or theoretically the changed starting point for the second stepping-off operation and shows how there is thus regained a portion of the usable length of the scale that was first made use of in stepping off the first span. It is in this way that the instrument newly becomes usable to caliper accumulatively two work dimensions whose sum is more than substantially half the usable length of the scale.

In Figs. 9 to 13 steps of my improved method are represented as in Figs. 4 to 8 except that the first span to be stepped off on the scale corresponds with the larger work dimension F—f while the second span to be stepped off corresponds with the smaller work dimension N—n. This difference in sequence of steps permits the use of a longer spacer rod 28a whose length may be 1½" and which may replace the ½" spacer rod 28 of Fig. 7. Although the work dimensions remain the same in Fig. 9 as in Fig. 4, it is seen in Fig. 13 that the final position on the scale arrived at by index mark 29 is the 1" graduation instead of the 1½" graduation. To this reading, according to the improved method, will be added one-half the length of spacer rod 28a, or ¾", which gives 1¾" as the true center distance C—c which was to be found. In Figs. 9–13 the measuring capacity of the instrument is of greater extent than in Figs. 4–8 because a center distance of 1¾" has become measurable by a dimension averaging scale only 2" in length.

Figs. 14, 15 and 16 show the improved method performed in a way to increase the center distance finding capacity of a measurement averaging instrument as much as 65% with the aid of the instrument and apparatus shown in Fig. 3. Because Figs. 4 to 13, inclusive, are merely diagrammatic while the remaining figures of the drawings portray certain mechanical parts of preferred construction, corresponding elements are identified throughout the drawings by identical reference numerals.

In Figs. 14, 15 and 16 the work will be assumed to have the following dimensions:

$$F—f = 13.8875''$$
$$N—n = 4.6125''$$
$$C—c = 9.250''$$

The stepping-off operations are as follows:

In their starting positions (not shown) both slides 20 and 21 are assumed to be in abutting contact and against the beam stop 40. In such starting position, as distinguished from Figs. 5 and 10, work sensing terminals 24, 25 are .0625" apart and the work sensing terminals 26, 27 are .4375" apart. Index 29 is at a beginning graduation (16) which reads .250". The stepped-off distance in the first span is 13.450". Note: this is .4375" less than the work dimension F—f because of the spread that existed between work sensing terminals 26, 27 in their starting positions. Relay point (18) has now been reached in Fig. 14 at the graduation reading 6.975".

Fig. 15 shows the new step of the improved method being mechanized through use of a spacer rod 28b with the aid of which relay point 18 can be transposed backward 10" on the scale to the position 18' at the graduation reading 1.975" when rod 28b is removed and slide 21 set back into contact with slide 20.

The distance to be stepped off in the second span is 4.550". Note: this is .0625" less than the work dimension N—n because of the gap that exists between sensing terminals 24, 25 when slides 20 and 21 are in abutting contact.

Fig. 16 shows the final reading on the scale to be 4.250". Adding 5.000" (one-half the length of the constant or spacer rod 28b) correctly gives 9.250" as the center distance C—c to be found.

It can be noted as in my aforesaid patent that the center distance in all cases has been ascertained without attention to or needing to know the diameters of the holes whose center spacing is being ascertained. Also that in Figs. 13 and 16, the final reading 32 arrived at on the scale is less than the reading of relay point 18 before transposition of the latter.

Commercially the spacer rod 28, 28a or 28b is appropriately termed a booster bar because of its purpose of increasing the measuring range of the dimension averaging instrument. As a convenient structural form of fixture incorporating such spacer block or blocks I prefer to mount one or more of them, as for instance the rods 28b and 28c in Fig. 1, on standards 33 which may comprise upright slabs of wood or any rigid thermosetting plastic material preferably capable of being machined to accurate dimensions. Each standard has cut or formed in its top edge two or more inverted keyhole-shape notches 34. The blind end of each notch is a round hole receiving the spacer rod endwise with a snug sliding fit as a means of assembling the fixture. The top outlet of the notch 34 is a vertical slot just wide enough to accommodate the thickness of the scale beam 17 with an easily insertable and removable fit for holding the beam in true parallel relation with the spacer rod 28b or 28c when the instrument is applied thereto as shown in Fig. 3.

Each spacer rod is fastened to the standards by screws 35 which maintain the standards rigid with the spacer rods and in parallel relation with each other in planes perpendicular to the axes of the spacer rods. The complete fixture, consisting of one or more spacer rods and their supporting standards, can rest stably on a flat support surface such as that of a plate 36 which may or need not be fastened to the bottom edges of the standards.

To keep the bottom edge of the scale beam 17 slightly elevated above the spacer rod so that the ends of the latter can be more sensitively contacted by the slides 20, 21, I prefer to equip each spacer rod near its end with a bumper ring 37 of semihard rubber or comparable elastic plastic having enough stretch to slip over the end of the spacer rod and seat itself by contracting into a circumferential groove in the periphery of the spacer rod.

As a matter of method distinguished from the use of apparatus it will be understood that the backward transposition of the relay point from location 18 to location 18' on the scale and also the subsequent stepping off on the scale of the second span can all be accomplished, as hereinbefore explained with respect to stepping off the first span, by laying off the appropriate distances on the scale with the mere aid of machinist's dividers which would transfer dimensions of the work to the scale. Hence the method defined in the appended claims is not dependent upon the use of any apparatus disclosed herein beyond merely the half value reading scale of graduations.

The claims are directed to and intended to cover all fair equivalents of the steps, parts and arrangements defined therein.

I claim:

1. The method of ascertaining the spacing between unmarked centers of parallel holes by use of a single continuous scale of half value reading dimensional graduations whose usable length is shorter than substantially twice the center spacing to be ascertained which comprises, stepping off forwardly from a beginning graduation on said scale a first span determined by the distance in a straight line between two points in the boundaries of respectively different holes thereby to arrive at a relay point on said scale, stepping off forwardly from said relay point on said scale a second span determined by the distance in said straight line between two other points in the boundaries of said respectively different holes reduced by a known dimensional constant thereby to arrive at an ultimate reading on said scale of a smaller dimension than the center spacing to be ascertained, and adding to said ultimate reading a dimensional value equal to one-half the dimensional value of said known constant thereby to obtain a correct evaluation of said center spacing.

2. The method of ascertaining the spacing between unmarked centers of parallel holes by use of a single continuous scale of half value reading dimensional graduations whose usable length is shorter than substantially twice the center spacing to be ascertained which comprises, stepping off forwardly from a beginning graduation on said scale a first span determined by the distance in a straight line between two points in the boundaries of respectively different holes thereby to arrive at a relay point on said scale, transposing said relay point backward on said scale an extent equal to a known dimensional constant, stepping off forwardly from said transposed relay point on said scale a second span determined by the distance in said straight line between two other points in the boundaries of said respectively different holes thereby to arrive at an ultimate reading on said scale of a smaller dimension than the center spacing to be ascertained, and adding to said ultimate reading a numerical value equal to one-half the dimensional value of said known constant thereby to obtain a correct evaluation of said center spacing.

3. The method of ascertaining the spacing between unmarked work centers respectively lying midway between one pair of discernible work marks and midway between a different pair of discernible work marks by use of a single continuous scale of half value reading dimensional graduations whose usable length is shorter than substantially twice the center spacing to be ascertained which comprises, stepping off forwardly from a beginning graduation on said scale a first span determined by the distance in a straight line between two of said work marks of respectively different pairs thereby to arrive at a relay point on said scale, stepping off forwardly from said relay point on said scale a second span determined by the distance in said straight line between two other of said work marks of said respectively different pairs reduced by a known dimensional constant thereby to arrive at an ultimate reading on said scale of a smaller dimension than the center spacing to be ascertained, and adding to said ultimate reading a dimensional value equal to one-half the dimensional value of said known constant thereby to obtain a correct evaluation of said center spacing.

4. The method of ascertaining the spacing between unmarked work centers respectively lying midway between one pair of discernible work marks and midway between a different pair of discernible work marks by use of a single continuous scale of half value reading dimensional graduations whose usable length is shorter than substantially twice the center spacing to be ascertained which comprises, stepping off forwardly from a beginning graduation on said scale a first span determined by the distance in a straight line between two of said work marks of respectively different pairs thereby to arrive at a relay point on said scale, transposing said relay point backward on said scale an extent equal to a known dimensional constant, stepping off forwardly from said transposed relay point on said scale a second span determined by the distance in said straight line between two other of said work marks of said respectively different pairs thereby to arrive at an ultimate reading on said scale of a smaller dimension than the center spacing to be ascertained, and adding to said ultimate reading a numerical value equal to one-half the dimensional value of said known constant thereby to obtain a correct evaluation of said center spacing.

5. In the method of ascertaining center spacing by stepping off successively along a half value reading scale of graduations two spans of measured work dimensions differentiated by an intervening relay point on said scale, the step of transposing said relay point backward a known distance along said scale after stepping off the first of said spans and before stepping off the second of said spans, thereby to regain for use in stepping off the second span a portion of the length of the scale already used in stepping off the first span, whereby the measuring range of a scale of limited usable length can be substantially increased by adding to the reading of the final graduation arrived at by stepping off of the second span one-half the measurement value of said known distance.

6. A fixture for use in the setting of dimension averaging instruments of the beam caliper type having a thin straight scale beam with work calipering legs projecting edgewise therefrom, comprising in combination, a straight spacer rod, a rack having within the body thereof a rod supporting seat of size and shape to leave bare substantially the whole of both ends of the rod and further to leave bare a rectilinear surface of said rod extending from one to the other of said ends, whereby to give the edge of said instrument beam access into close parallelism with said rectilinear rod surface while the legs of the instrument contact the ends of the rod for setting said instrument in accurate accordance with the length thereof.

7. A fixture as defined in claim 6, in which the said rack includes two spaced apart relatively thin standards, each bearing a rod supporting seat and disposed in crosswise relation to the axis of the said spacer rod, and means fastening each of said standards in rigid relation to the said spacer rod.

8. A fixture for use with dimension averaging instruments having a scale beam, comprising a spacer rod, a rack supporting said rod and overhung by the end portions thereof, said rack containing open ended slots reaching inward of the rack to the periphery of said spacer rod and disposed in radial relation to the axis of the rod, whereby to receive the scale beam edgewise and constrain it in close parallelism with the rod for taking by means of said instrument an accurate lengthwise measurement from the rod.

9. A fixture for use with dimension averaging instruments having a scale beam, comprising a spacer rod, a rack supporting said rod and overhung by the end portions thereof constructed to give said beam access into close parallelism with said rod for taking by means of said instrument a lengthwise measurement from said rod, together with a bumper of material softer than metal projecting from the peripheral surface of the said spacer rod relatively near the ends thereof in position to prevent contact between the scale beam of the instrument and said spacer rod when taking a measurement from the latter.

10. A fixture for use with dimension averaging instruments having a scale beam, comprising a plurality of spacer rods having parallel axes, a rack including two relatively thin standards spaced apart lengthwise of said rods and disposed in crosswise relation to said axes, said standards being outwardly overhung by the end portions respectively of said rods and constructed to give said beam access into close parallelism with either of said rods for taking by means of the instrument a lengthwise measurement from the rod, both of said rods being fastened in rigid relation to each of said standards whereby the fixture is made self rigid without extraneous means of support.

11. A fixture for use in the setting of dimension averaging instruments of the beam caliper type having a thin straight scale beam with work calipering legs projecting edgewise therefrom, comprising in combination, a plurality of straight spacer rods, a rack having within the body thereof a plurality of rod supporting seats on which said rods may rest respectively in side by side parallel relationship, said seats being of size and shape to leave bare substantially the whole of both ends of the rods and further to leave bare rectilinear surfaces of said rods extending from one to the other of said ends whereby to give the edge of said instrument beam access into close parallelism with said rectilinear rod surfaces while the legs of the instrument contact the ends of the rod for setting said instrument in accurate accordance with the length thereof.

References Cited in the file of this patent

UNITED STATES PATENTS

| | | |
|---|---|---|
| 2,350,394 | Ellstrom | June 6, 1944 |
| 2,521,934 | Mitchell | Sept. 12, 1950 |